United States Patent [19]
Bessette et al.

[11] Patent Number: 5,820,214
[45] Date of Patent: Oct. 13, 1998

[54] VEHICLE SEAT CUSHION ASSEMBLY

[75] Inventors: Anne Bessette, Lake Orion; William Barr, Royal Oak; Lawrence Maich, Taylor, all of Mich.

[73] Assignee: Lear Corporation, Southfield, Mich.

[21] Appl. No.: 705,199

[22] Filed: Aug. 29, 1996

[51] Int. Cl.$^6$ ................................................. A47C 31/02
[52] U.S. Cl. ........................... 297/228.13; 5/657; 5/652; 297/284.5
[58] Field of Search .................... 297/284.1, 284.5, 297/228.13, 219.1; 5/657, 652, 653, 723

[56] References Cited

U.S. PATENT DOCUMENTS

| | | | |
|---|---|---|---|
| 3,728,744 | 4/1973 | Kimbro, Jr. et al. | 5/652 X |
| 4,036,524 | 7/1977 | Takamatsu | 297/219.1 |
| 4,047,756 | 9/1977 | Ney | 297/219.1 |
| 4,383,713 | 5/1983 | Roston | 5/652 X |
| 5,018,790 | 5/1991 | Jay | 5/653 X |
| 5,407,248 | 4/1995 | Jay et al. | 297/284.1 |
| 5,533,787 | 7/1996 | Xiang | 297/284.5 |

*Primary Examiner*—Peter M. Cuomo
*Assistant Examiner*—Stephen Vu
*Attorney, Agent, or Firm*—Brooks & Kushman P.C.

[57] ABSTRACT

A vehicle seat back cushion assembly includes a substantially U-shaped outer cushion with a removable cushion insert positioned within the central opening formed by the substantially U-shaped outer cushion. The removable cushion insert cooperates with the outer cushion to form an aperture therebetween. Plastic strips are provided on the outer cover and cushion insert such that at least one Christmas tree-type fastener may be inserted through the plastic strips to attach the removable insert and outer cushion to the seat back frame. The cushion insert is also zippered to the outer cushion.

9 Claims, 4 Drawing Sheets

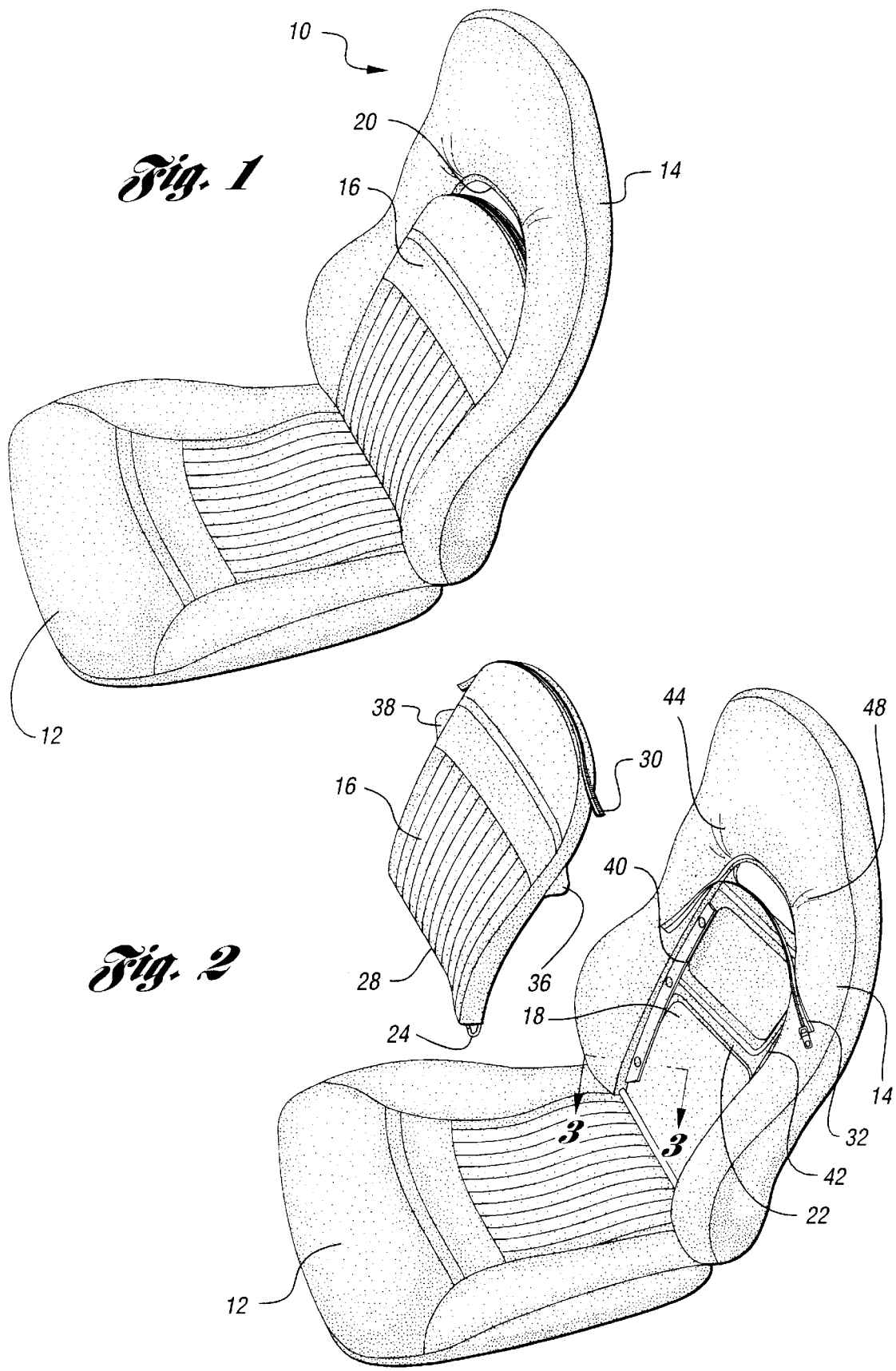

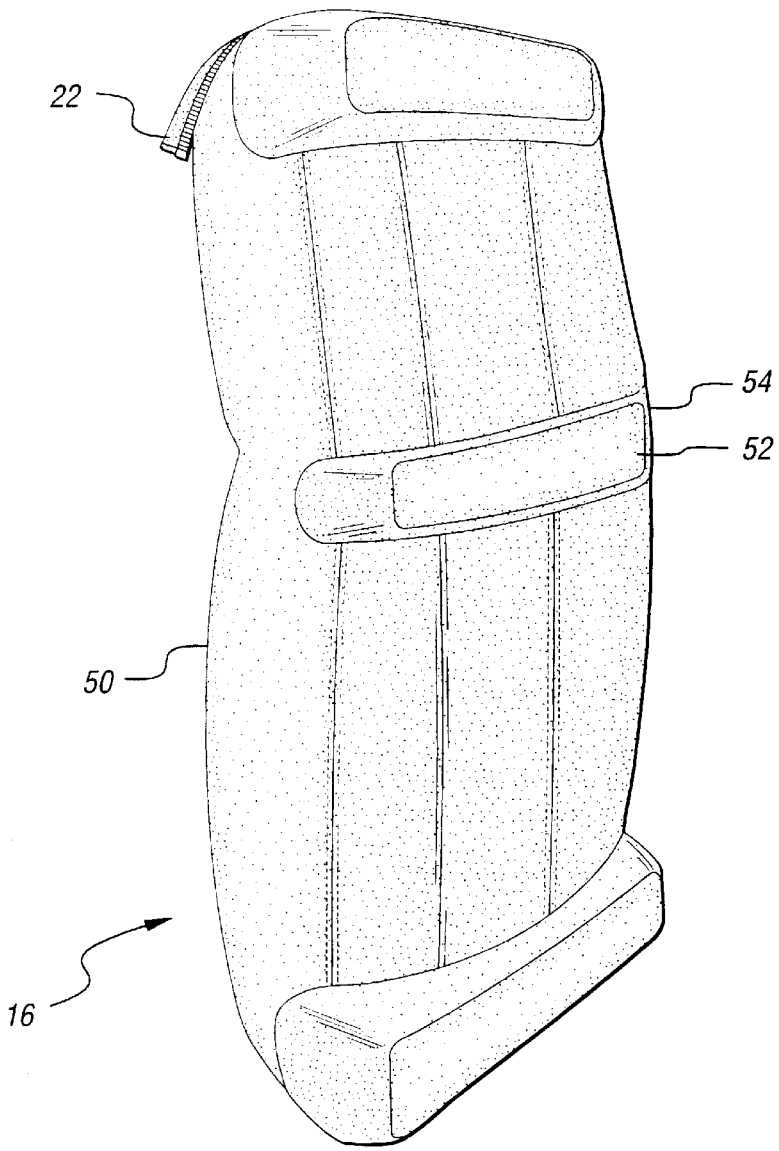
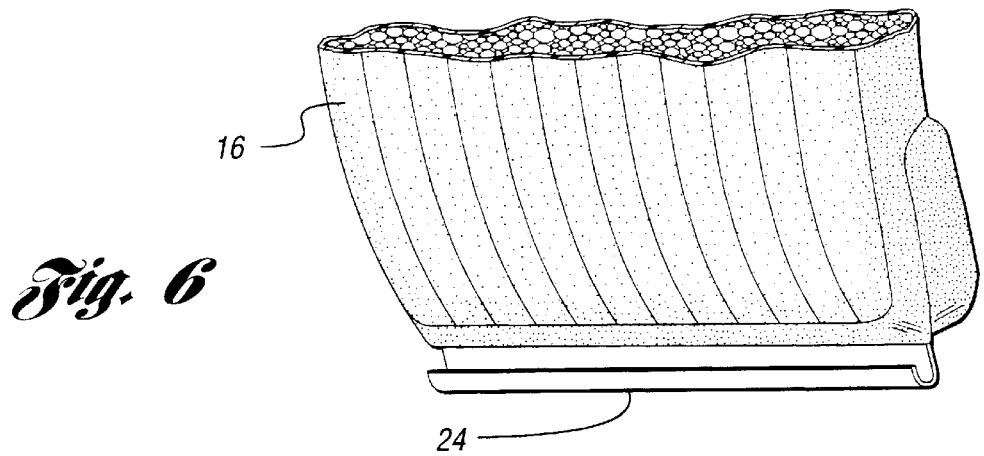

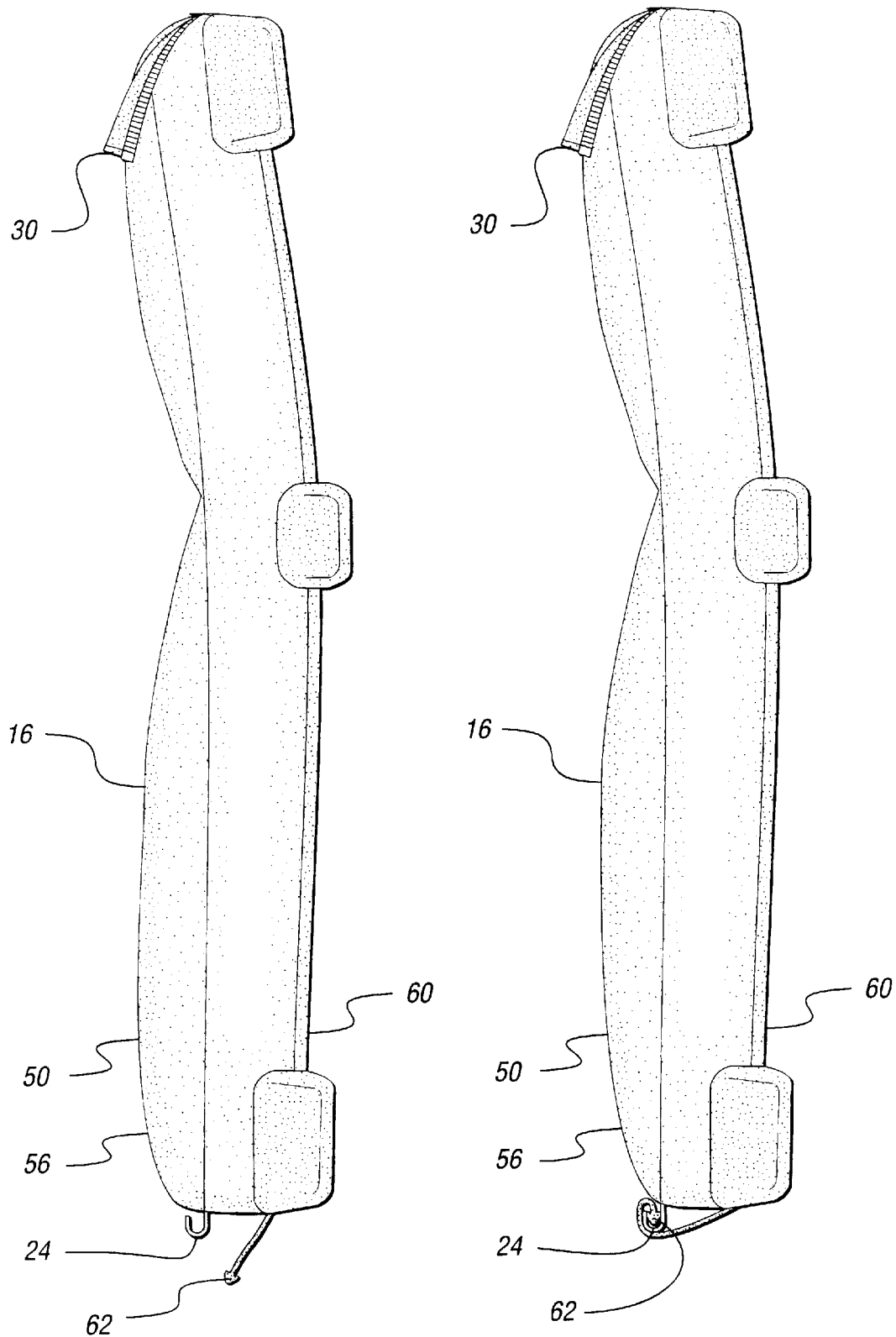

VEHICLE SEAT CUSHION ASSEMBLY

TECHNICAL FIELD

The present invention relates to a vehicle seat cushion assembly, and more particularly to a vehicle seat cushion assembly including a removable insert portion.

BACKGROUND OF THE INVENTION

In recent years, vehicle seat designs have become a very important vehicle feature. Vehicle seats of increasing adjustability and functionality and improved comfort have added great complexity to the design process. Universal adjustment capability as well as lumbar support adjustability features have increased assembly costs and complicated seat cushion designs.

It is desirable to provide a seat back cushion assembly which is inexpensively assembled, easily and repetitively fitted with controlled tolerances, and functional with lumbar support and other devices without compromising aesthetic features.

SUMMARY OF THE INVENTION

The present invention provides a vehicle seat back cushion assembly for attachment to a seat back frame, in which a substantially U-shaped outer cushion surrounds a removable cushion insert positioned within a central opening formed by the outer cushion. The cushion insert has a top portion which is zippered to outer cushion, and a J-strip connector on the bottom for attachment to the seat frame. Christmas tree fasteners attach plastic flaps extending from the insert cushion and outer cushion to the back frame.

Accordingly, an object of the present invention is to provide a vehicle seat back cushion assembly comprising a substantially U-shaped outer cushion with a removable cushion insert positioned in a central opening formed by the outer cushion.

Another object of the present invention is to provide a seat back cushion assembly which is inexpensive to manufacture and which includes plastic flaps extending from an outer cushion and from an insert cushion for attachment to the seat back frame.

A further object of the present invention is to provide a vehicle seat back cushion assembly which includes an outer substantially U-shaped cushion and a removable cushion insert which is bendable for cooperation with a Lumbar support device.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a perspective view of a vehicle seat assembly accordance with the present invention;

FIG. 2 shows a partially exploded perspective view of the seat assembly of FIG. 1;

FIG. 5 shows a rear perspective view of a removable cushion insert in accordance with the present invention;

FIG. 6 shows a cut-away perspective view of the bottom portion of a removable cushion insert in accordance with the present invention;

FIG. 7 shows a side view of an insert cushion with the lower arrow retainer unfastened; and FIG. 8 shows a side view of an insert cushion with the lower arrow retainer fastened.

DETAILED DESCRIPTION OF THE PREFERRED EMBODIMENT

Figure 3:
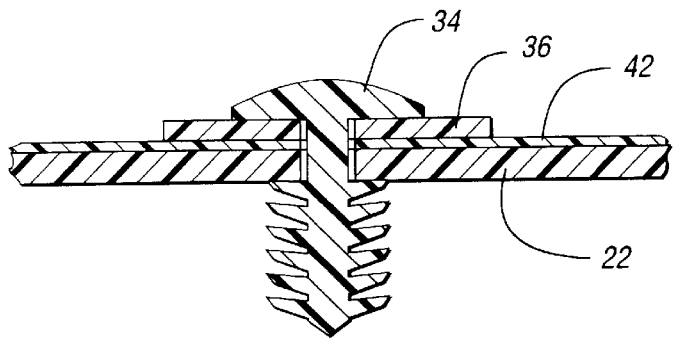
FIG. 3 shows a vertical cross-sectional view taken through line 3—3 of FIG. 2.
Figure 4:
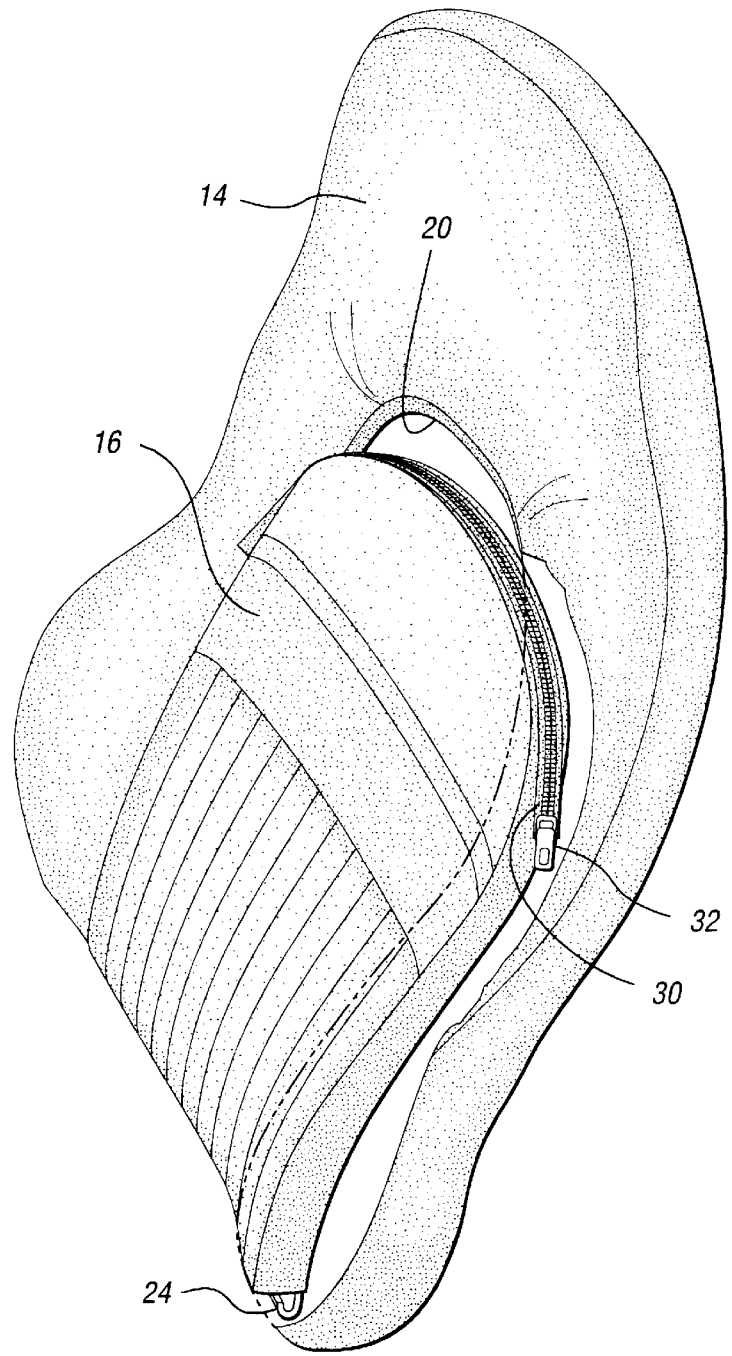
FIG. 4 shows a partially cut-away perspective view of seat back assembly in accordance with the present invention.

Referring to FIG. 1, a vehicle seat cushion assembly 10 is shown in accordance with the present invention. As shown, the vehicle seat cushion assembly 10 comprises a lower seat cushion 12, a substantially U-shaped outer cushion 14, and a removable cushion insert 16 positioned within the central opening 18 (shown in FIG. 2) of the substantially U-shaped outer cushion 14. With the removable cushion insert 16 installed within the U-shaped outer cushion 14, an aperture 20 is formed therebetween. The U-shaped outer cushion 14 and insert 16 are supported by the seat back frame 22.

Once the cushion insert 16 has been placed within the central opening 18, the next step is to zip the insert zipper 30 to the outer cushion zipper 32. Once the J-strip connector 24 and zippers 30,32 have been connected, at least one Christmas tree-type fastener 34 is inserted through the plastic strips 36,38 of the removable insert 16, and further through the plastic strips 40,42 which are secured to the outer cushion 14. The plastic strips 36,38,40,42 are preferably sewn into the respective cushion. As shown in FIG. 3, the Christmas tree fastener 34 extends through the plastic strip 36 of the cushion insert 16, and further through the plastic strip 42 of the outer cushion 14, and finally through the seat back frame 22 to rigidly secure the insert cushion 16 in the appropriate position. With this configuration, the insert cushion 16 may be accurately positioned within the central opening for repeatability of location such that the size of the aperture 20 is consistent.

Preferably, a nuance leather (non-grained) is used. As the leather is stretched to form the outer cushion 14, desirable wrinkles 44,48 are formed.

As shown in FIG. 5, the removable cushion insert 16 comprises an insert cover 50 enclosing an insert pad 52. The insert cover 50 comprises at least one slit 54 formed therein to facilitate bending of the insert cushion 16 for use in conjunction with a lumbar support device supported by the seat back frame 22 in the central opening area 18.

Turning to FIGS. 7 and 8, the front 56 of the insert cover 50 is secured to the rear 60 of the insert cover by the J-channel 24 and arrow retainer 62. The arrow retainer 62 is pulled downward and snapped into the J-channel 24 for this attachment.

While the best mode for carrying out the invention has been described in detail, those familiar with the art to which this invention relates will recognize various alternative designs and embodiments for practicing the invention within the scope of the appended claims.

What is claimed is:

1. A vehicle seat back cushion assembly for attachment to a seat back frame, the assembly comprising:

a substantially U-shaped outer cushion comprising an outer foam pad and an outer cover adapted to be supported on the seat back frame, said substantially U-shaped outer cushion forming a central opening;

a removable cushion insert positioned within the central opening and including an insert pad and an insert cover, said cushion insert cooperating with said outer cushion to form an aperture therebetween;

first and second plastic strips secured to said outer cover and extending into said central opening;

third and fourth plastic strips secured to said insert cover; and a plurality of Christmas-tree fasteners adapted attaching said first, second, third and fourth plastic strips to the back frame.

2. The vehicle seat back cushion assembly of claim 1, wherein said insert comprises a top portion and a bottom portion, and said assembly further comprises a zipper for removably attaching said insert cover to said outer cover at said top portion and a J-strip connector and arrow fastener for closing said bottom portion.

3. The vehicle seat back cushion assembly of claim 1, wherein said inner cover comprises a rearward portion having a laterally slit formed therein to facilitate bending for use in conjunction with a lumbar support device.

4. A vehicle seat assembly, comprising:

an injection molded back frame;

a substantially U-shaped outer cushion comprising an outer foam pad and an outer cover supported on the seat back frame, said substantially U-shaped outer cushion forming a central opening;

a removable cushion insert positioned within the central opening and including an insert pad and an insert cover, said cushion insert cooperating with said outer cushion to form an aperture therebetween;

first and second plastic strips secured to said outer cover and extending into said central opening;

third and fourth plastic strips secured to said insert cover; and a plurality of Christmas-tree fasteners attaching said first, second, third and fourth plastic strips to the back frame.

5. The vehicle seat assembly of claim 4, wherein said insert comprises a top portion and a bottom portion, and said assembly further comprises a zipper for removably attaching said insert cover to said outer cover at said top portion and a J-strip connector and arrow fastener for closing said bottom portion.

6. The vehicle seat assembly of claim 4, further comprising a lumbar support device connected to the seat back frame, and wherein said inner cover comprises a rearward portion having a slit formed therein to facilitate bending for use in conjunction with said lumbar support device.

7. A vehicle seat back cushion assembly for attachment to a seat back frame, the assembly comprising;

a substantially U-shaped outer cushion comprising an outer foam pad and an outer cover adapted to be supported on the seat back frame, said substantially U-shaped outer cushion forming a central opening;

a removable cushion insert positioned within the central opening and including an insert pad and an insert cover, said cushion insert cooperating with said outer cushion to form an aperture therebetween;

first and second plastic strips secured to said outer cover and extending into said central opening;

third and fourth plastic strips secured to said insert cover; and a plurality of plastic Christmas tree fasteners adapted for attaching said first, second, third and fourth plastic strips to the back frame.

8. A vehicle seat back cushion assembly for attachment to a seat back frame, the assembly comprising:

a substantially U-shaped outer cushion comprising an outer foam pad and an outer cover adapted to be supported on the seat back frame, said substantially U-shaped outer cushion forming a central opening;

a removable cushion insert positioned within the central opening and including an insert pad and an insert cover, said cushion insert cooperating with said outer cushion to form an aperture therebetween;

wherein said insert comprises a top portion and a bottom portion, and said assembly further comprises a zipper for removably attaching said insert cover to said outer cover at said top portion and a J-strip connector and arrow fastener for closing said bottom portion.

9. A vehicle seat back cushion assembly for attachment to a seat back frame, the assembly comprising:

a substantially U-shaped outer cushion comprising an outer foam pad and an outer cover adapted to be supported on the seat back frame, said substantially U-shaped outer cushion forming a central opening;

a removable cushion insert positioned within the central opening and including an insert pad and an insert cover, said cushion insert cooperating with said outer cushion to form an aperture therebetween;

first and second plastic strips secured to said outer cover and extending into said central opening;

third and fourth plastic strips secured to said insert cover;

a plurality of Christmas tree fasteners adapted for attaching said first, second, third and fourth plastic strips to the back frame;

wherein said insert comprises a top portion and a bottom portion, and said assembly further comprises a zipper for removably attaching said insert cover to said outer cover at said top portion and a J-strip connector and arrow fastener for closing said bottom portion.

* * * * *

UNITED STATES PATENT AND TRADEMARK OFFICE
CERTIFICATE OF CORRECTION

PATENT NO : 5,820,214
DATED : October 13, 1998
INVENTOR(S) : Anne Bessette, William Barr, Lawrence Maich It is certified that error appears in the above-identified patent and that said Letters Patent is hereby corrected as shown below:

Column 3, Line 3,    After "adapted" insert --for--.

Column 3, Line 14,   After "laterally" insert --extending--.

Signed and Sealed this

Twenty-third Day of March, 1999

Attest:

Q. TODD DICKINSON

*Attesting Officer*    *Acting Commissioner of Patents and Trademarks*